US007434031B1

(12) United States Patent
Spracklen et al.

(10) Patent No.: US 7,434,031 B1
(45) Date of Patent: Oct. 7, 2008

(54) EXECUTION DISPLACEMENT READ-WRITE ALIAS PREDICTION

(75) Inventors: Lawrence A. Spracklen, Boulder Creek, CA (US); Santosh G. Abraham, Pleasanton, CA (US); Stevan Vlaovic, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 541 days.

(21) Appl. No.: 10/822,390

(22) Filed: Apr. 12, 2004

(51) Int. Cl.
*G06F 9/30* (2006.01)
*G06F 9/40* (2006.01)
*G06F 15/00* (2006.01)

(52) U.S. Cl. ..................... 712/217; 712/241
(58) Field of Classification Search ............... 712/217, 712/218, 241, 216
See application file for complete search history.

(56) References Cited

U.S. PATENT DOCUMENTS 5,778,245 A * 7/1998 Papworth et al. .............. 712/23
5,933,618 A * 8/1999 Tran et al. .................. 712/217
6,021,485 A * 2/2000 Feiste et al. ................ 712/216

OTHER PUBLICATIONS

Shen et al., "Modern Processor Design-Fundamentals of Superscalar Processors", 2003, McGraw-Hill Higher Education, Beta edition, Chapter 4, pp. 196-202.*

Rajwar, Ravi, "Speculation-Based Techniques for Lock-Free Execution of Lock-Based Programs," PhD Disertation, School of Computer Sciences, University of Wisconsin, Madison, WI, 2002, pp. 1-224.

Steffan, J. Gregory, "Hardware Support for Thread-Level Speculation," PhD Thesis, School of Computer Science, Carnegie Mellon University, Apr. 2003, pp. 1-161.

Steffan, J. Gregory et al., "A Scalable Approach to Thread-Level Speculation," *ACM SIGARCH Computer Architecture News*, vol. 28, Issue 2, May 2000, 12 pages.

* cited by examiner

*Primary Examiner*—Tonia L. M. Dollinger
*Assistant Examiner*—Jesse Moll
(74) *Attorney, Agent, or Firm*—Dorsey & Whitney LLP

(57) ABSTRACT

RAW aliasing can be predicted with register bypassing based at least in part on execution displacement alias prediction. Repeated aliasing between read and write operations (e.g., within a loop), can be reliably predicted based on displacement between the aliasing operations. Performing register bypassing for predicted to alias operations facilitates faster RAW bypassing and mitigates the performance impact of aliasing read operations. The repeated aliasing between operations is tracked along with register information of the aliasing write operations. After exceeding a confidence threshold, an instance of a read operation is predicted to alias with an instance of a write operation in accordance with the previously observed repeated aliasing. Based on displacement between the instances of the operations, the register information of the write operation instance is used to bypass data to the read operation instance.

64 Claims, 12 Drawing Sheets

Third loop iteration, aliasing detected between this load and store of first iteration Operation Queue 501

| Static ID | Dynamic ID | Operation |
|---|---|---|
| 155 | 67 | load [r6], r1 |
| 156 | 68 | add r1, r2, r3 |
| 157 | 69 | store r3, [r6 + 8] |
| 158 | 70 | add r4, 1, r4 |
| 159 | 71 | add r6, 4, r6 |
| 160 | 72 | compare r4, r5 |
| 161 | 73 | branchOnNotEqual 155 |

Aliased Read Op Encoding 503

| Static ID | Displacement | Alias Prediction Confidence | Alias Prediction Validity |
|---|---|---|---|
| 155 | 12 | 1 | 0 |
| ... | ... | ... | ... |
| ... | ... | ... | ... |

Aliased Write Op Encoding 505

| Static ID | Alias Prediction Confidence | Alias Prediction Validity |
|---|---|---|
| 157 | 1 | 0 |
| ... | ... | ... |
| ... | ... | ... |

Alias Prediction Register Bypass Encoding 507

| Write Op Dynamic ID | Renamed Register | Predicted to Alias Read Op Counter |
|---|---|---|
| -- | -- | -- |
| -- | -- | -- |
| -- | -- | -- |

FIG. 5A

Operation Queue 501

| Static ID | Dynamic ID | Operation |
|---|---|---|
| 155 | 81 | load [r6], r1 |
| 156 | 82 | add r1, r2, r3 |
| 157 | 83 | store r3, [r6 + 8] |
| 158 | 84 | add r4, 1, r4 |
| 159 | 85 | add r6, 4, r6 |
| 160 | 86 | compare r4, r5 |
| 161 | 87 | branchOnNotEqual 155 |

Fifth loop iteration

Aliased Read Op Encoding 503

| Static ID | Displacement | Alias Prediction Confidence | Alias Prediction Validity |
|---|---|---|---|
| 155 | 12 | 2 → 3 | 0 → 1 |
| ... | ... | ... | ... |
| ... | ... | ... | ... |

Aliased Write Op Encoding 505

| Static ID | Alias Prediction Confidence | Alias Prediction Validity |
|---|---|---|
| 157 | 2 → 3 | 1 |
| ... | ... | ... |
| ... | ... | ... |

Alias Prediction Register Bypass Encoding 507

| Write Op Dynamic ID | Renamed Register | Predicted to Alias Read Op Counter |
|---|---|---|
| → 83 | → p3 | -- |
| -- | -- | -- |
| -- | -- | -- |

FIG. 5B

Operation Queue 501

| Static ID | Dynamic ID | Operation |
|---|---|---|
| 155 | 95 | load [r6], r1 |
| 156 | 96 | add r1, r2, r3 |
| 157 | 97 | store r3, [r6 + 8] |
| 158 | 98 | add r4, 1, r4 |
| 159 | 99 | add r6, 4, r6 |
| 160 | 100 | compare r4, r5 |
| 161 | 101 | branchOnNotEqual 155 |

Seventh loop iteration

Aliased Read Op Encoding 503

| Static ID | Displacement | Alias Prediction Confidence | Alias Prediction Validity |
|---|---|---|---|
| 155 | 12 | 4→5 | 1 |
| ... | ... | ... | ... |
| ... | ... | ... | ... |

Aliased Write Op Encoding 505

| Static ID | Alias Prediction Confidence | Alias Prediction Validity |
|---|---|---|
| 157 | 4→5 | 1 |
| ... | ... | ... |
| ... | ... | ... |

Alias Prediction Register Bypass Encoding 507

| Write Op Dynamic ID | Renamed Register | Predicted to Alias Read Op Counter |
|---|---|---|
| 83 | p3 | 0→1 |
| 90 | p2 | 0 |
| →97 | →p8 | -- |

FIG. 5C

Operation Queue 501

| Static ID | Dynamic ID | Operation |
|---|---|---|
| 155 | 263 | load [r6], r1 |
| 156 | 264 | add r1, r2, r3 |
| 157 | 265 | store r3, [r6 + 8] |
| 158 | 266 | add r4, 1, r4 |
| 159 | 267 | add r6, 4, r6 |
| 160 | 268 | compare r4, r5 |
| 161 | 269 | branchOnNotEqual 155 |

Thirtieth loop iteration

Aliased Read Op Encoding 503

| Static ID | Displacement | Alias Prediction Confidence | Alias Prediction Validity |
|---|---|---|---|
| 155 | 12 | 28 → 29 | 1 |
| ... | ... | ... | ... |
| ... | ... | ... | ... |

Aliased Write Op Encoding 505

| Static ID | Alias Prediction Confidence | Alias Prediction Validity |
|---|---|---|
| 157 | 28 → 29 | 1 |
| ... | ... | ... |
| ... | ... | ... |

Alias Prediction Register Bypass Encoding 507

| Write Op Dynamic ID | Renamed Register | Predicted to Alias Read Op Counter |
|---|---|---|
| 251 | p3 | 0 → 1 |
| 258 | p9 | 0 |
| 244 → 265 | P12 → p1 | 0 |

FIG. 5D

EXECUTION DISPLACEMENT READ-WRITE ALIAS PREDICTION

BACKGROUND

1. Field of the Invention

The present invention relates to the field of computers. More specifically, the present invention relates to computer architecture.

2. Description of the Related Art

The phenomenon of a load operation accessing a memory location that has been modified by a store operation is commonly referred to as a memory Read-after-Write (RAW) data hazard, or memory RAW aliasing. Memory RAW aliasing occurs between a significant percentage of load operations and respective store operations. There are a variety of reasons for the common occurrence of memory RAW aliasing in many applications, including register pressure, pointer disambiguation, parameter passing, and integer to floating point moves.

Until recently, many processors have not provided an instruction to move data directly from an integer register to a FP (floating point) register (and vice versa). In the absence of directly moving data between these registers, data is stored to memory and then reloaded, thus introducing memory RAW aliasing. While FP to integer and integer to FP move functionality is now available on many modern processors, many legacy codes do not take advantage of this new functionality. In addition, unless all processors across a product line support the integer to FP and FP to integer moves, generic applications may not be able to explicitly leverage the new move instructions.

The need to frequently store and reload data from/to the registers to/from memory can have a detrimental impact on performance as the latency of RAW bypassing through memory is very high. While typical level-1 cache hit latencies are only 1 to 3 cycles, the bypass of a store value to an aliasing load can take up to an order of magnitude longer.

In conventional processors, store operations first write into a store queue/store buffer (SQ/SB). Load operations check the store buffer in parallel with the data cache. If the store buffer has the requested memory location, the load value is retrieved from the store buffer. The latency of accessing the store buffer is often larger than that of accessing the level-1 cache. Hence, a stale value from the cache may be used in operations dependent on the load operations before the signal arrives from the store buffer indicating memory RAW aliasing. This situation is more likely when the separation in cycles between the store operation and the load operation is small, since the cache is likely not to have updated yet. In this case, the load mis-speculation is corrected by reissuing the load operation and its dependents, with the correct value from the store buffer.

Since the cost of such mis-speculation typically exceeds 20 cycles in conventional processors, conventional processors may use mechanisms to detect that certain store operations and load operations are likely to alias. If a load operation aliases repeatedly with a store operation on many dynamic executions, the load operation and the store operation may, for instance, be tagged in the instruction cache. On subsequent executions, tagged load operations are not permitted to issue until tagged store operations have retired. Thus, the processor does not permit certain load operations to speculate past certain store operations, while permitting the rest of the load operations to freely speculate past store operations.

Some conventional out-of-order processors permit a load operation to be issued even before an aliasing store operation writes into the store buffer. When such a processor executes a load operation before an aliasing store operation writes into the store buffer, the processor cannot detect that the load operation aliases with an older, as yet, unissued store operation. When the store operation issues, these processors determine if a younger load operation was issued earlier than an older aliasing store operation. Subsequently, the processor reissues the younger load operation after the store operation has written into the store buffer. In these processors, the load address and associated information is kept in a load queue (LQ). Sometimes the load queue is combined with the store buffer into a single structure that is commonly called the Load Store Queue (LSQ). Stores check the LSQ and detect younger loads with a matching address and cause them to reissue.

Recovering from mis-speculation and re-issuing instructions complicates processor design. Less complex approaches have also been investigated and utilized. A store operation may be split into two parts, the address generation part and the actual store. Younger load operations wait until the address generation part of the store operation completes, at which point the processor allows the load operation to issue, unless its address matches with the older, as yet, unissued store operations address.

Since the majority of load operations do not alias with older store operations, it is advantageous for processors to allow most loads to speculate. The previously described mechanisms may restrict speculation for certain load operations. When load operations do alias however, these mechanisms can require the load operation to reissue or wait until the aliasing store operation is retired or written into the store buffer. Improved techniques are desired.

SUMMARY OF THE INVENTION

It has been discovered that repeated aliasing between read and write operations (e.g., within a loop), can be reliably predicted based on displacement between the aliasing operations. Advantageously, the prediction can be made during register rename, thus allowing for register bypass. Performing register bypassing for predicted to alias operations facilitates faster RAW bypassing and mitigates the performance impact of aliasing read operations.

Confidence in an alias prediction is built with observation of repeated memory RAW aliasing. After observation of a given number of repeated aliasing between operations, a confident prediction of aliasing between the operations is made. The register information of the predicted to alias write operation is utilized for data bypassing to the predicted to alias read operation.

These and other aspects of the described invention will be better described with reference to the Description of the Preferred Embodiment(s) and accompanying Figures.

BRIEF DESCRIPTION OF THE DRAWINGS

The present invention may be better understood, and its numerous objects, features, and advantages made apparent to those skilled in the art by referencing the accompanying drawings.

FIG. 4A depicts an exemplary flowchart for processing a read operation. FIG. 4B continues from FIG. 4A.

FIGS. 5A-5D depict exemplary illustrations of encodings being updated with execution of a loop. The exemplary illustration is meant to aid in understanding the invention and not meant to be limiting upon the invention. FIG. 5A depicts updating of encodings with respect to a second loop iteration after aliasing has already been detected. FIG. 5B continues the exemplary illustration and illustrates results of a fifth loop iteration. FIG. 5C continues the exemplary illustration and illustrates results of a sixth loop iteration. FIG. 5D continues the exemplary illustration and illustrates results of a thirty-first loop iteration.

The use of the same reference symbols in different drawings indicates similar or identical items.

DESCRIPTION OF THE PREFERRED REALIZATION(S)

The description that follows includes exemplary systems, methods, techniques, instruction sequences and computer program products that embody techniques of the present invention. For instance, particular implementations are described that track aliasing read and write operations with particular identifiers, such as program counters. Also, particular implementations are described with reference to a data hazard detection module, which includes a collection of structures utilized to determine existence of a data hazard. However, it is understood that the described invention may be practiced without these specific details. In other instances, well-known protocols, structures and techniques have not been shown in detail in order not to obscure the invention.

Figure 1:
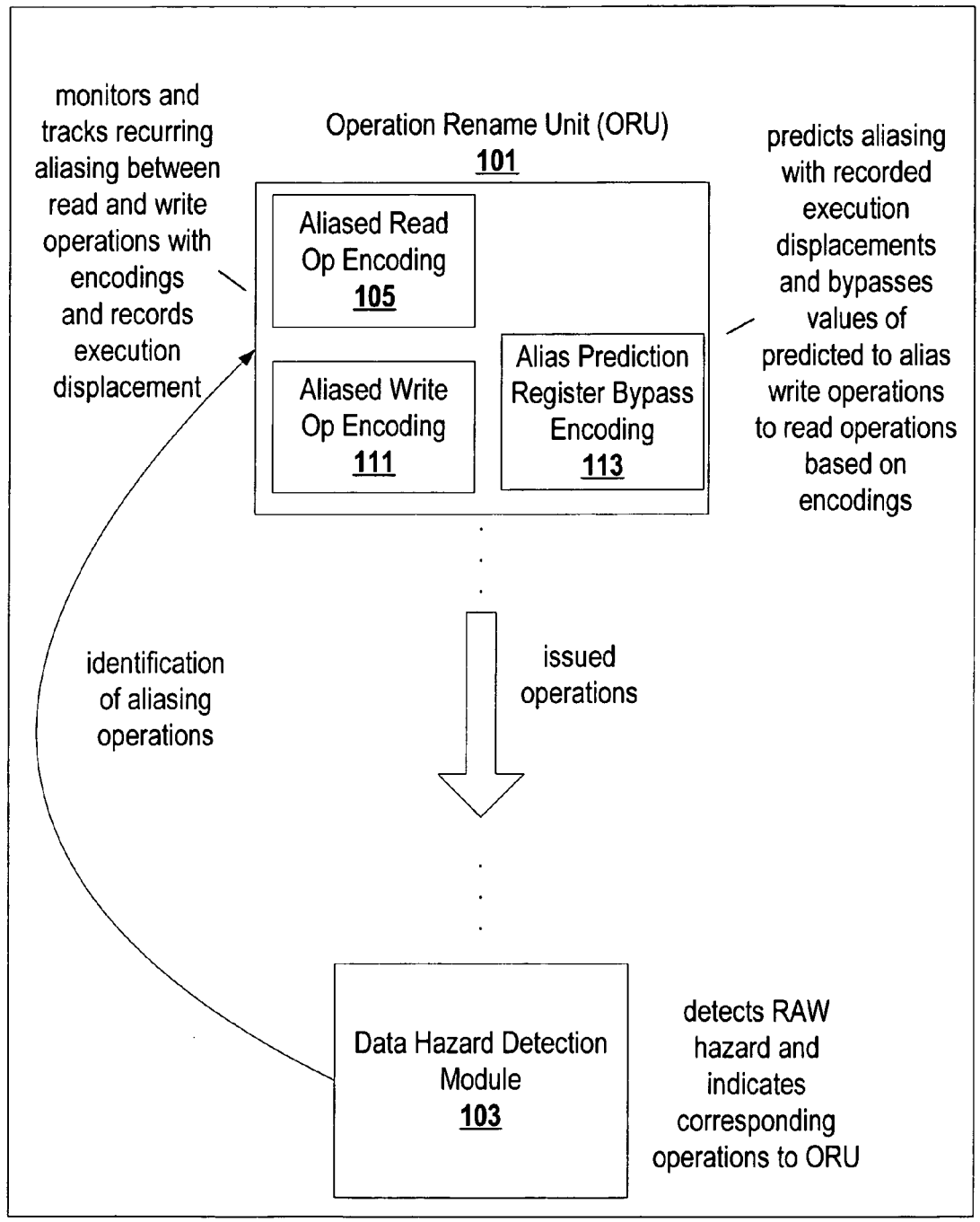
FIG. 1 depicts an exemplary processor with execution displacement alias prediction encodings.

FIG. 1 depicts an exemplary processor with execution displacement alias prediction encodings. In FIG. 1, a processor 107 includes an operation rename unit 101 and a data hazard detection module 103. The data hazard detection module 103, as previously discussed, includes structures utilized to detect a data hazard. Particular implementations of a data hazard detection module include a memory disambiguation buffer (MDB), Load Store Queue (LSQ), etc. However, the described invention is not limited to particular implementations for detecting data hazards, and it should be understood that various realizations of the invention detect data hazards differently (e.g., a single unit that includes multiple stores and logic, separate units that collectively detect data hazards, software emulation, etc.). The operation rename unit 101 includes an aliased read operation encoding 105, an aliased write operation encoding 111, and an alias prediction register bypass encoding 113. The encodings 105, 111, and 113 may be implemented differently in various realizations of the invention (e.g., hardware tables, data structures, a single encoding with multiple access points, etc.). The collection of encodings (whether implemented as a single encoding or plural encoding) and logic associated therewith, may be referred to as an alias predictor. The aliased read operation encoding 105 identifies read operations that have been detected as aliased and an execution displacement for the identified read operation and corresponding write operation. The aliased read operation encoding may also include additional information to track repetition of alias detection of an identified read operation (e.g., a confidence indicator, a valid bit, etc.). The aliased write operation 111 identifies write operations that have been detected as aliased. The alias prediction register bypass encoding 113 identifies a potential aliasing write operation and its renamed register. The alias prediction register bypass encoding 113 may also track the number of predictions made for each indicated write operation.

The operation rename unit 101, which manages association (renaming) of architectural registers to working registers, performs execution displacement based read-write alias prediction using the encodings 105, 111, and 113. Particular implementations of renaming architectural registers to working registers vary in different realizations of the invention (e.g., associating logical registers to physical registers, associating logical registers to logical registers, associating physical registers to physical registers, etc.). The operation rename unit 101 receives indications of aliasing operations from the data hazard detection module 103, which detects memory read-after-write (RAW) aliasing and indicates the corresponding aliasing operations to the operation rename unit 101. The operation rename unit 101 monitors and tracks repeated aliasing between read operations and write operations and records respective execution displacement of the aliasing operations. Execution displacement is the difference or distance between operations with respect to program execution or operation sequence execution. For example, in the exemplary code below, the store instruction with program counter 101 and the load instruction with program counter 104 have a non-execution displacement of three and an execution displacement of three within the same loop iteration. However, the store operation has an execution displacement of four with the load operation of the previous iteration during execution, and an execution displacement of eleven with the load operation two iterations prior.

```
100  add
101  store
102  add
103  sub
104  load
106  compare
107  branchOnNotEqual 100
```

The operation rename unit 101 uses the recorded execution displacements and encodings 105, 111, and 113 to predict read-write aliases. For predicted aliases, the operation rename unit 101 bypasses values of predicted to alias write operations to their respective read operations based on the encodings 105, 111, and 113.

Basing alias prediction on observation of repeated aliasing and execution displacement increases accuracy of alias prediction. Optimizing such high frequency aliasing provides substantial gains in performance. Bypassing values of predicted to alias write operations through registers rather than through memory (or worse, incorrectly speculated to hit in the L1 cache), facilitates faster facilitates faster RAW bypassing and mitigates the performance impact of aliasing read operations.

Figure 2:
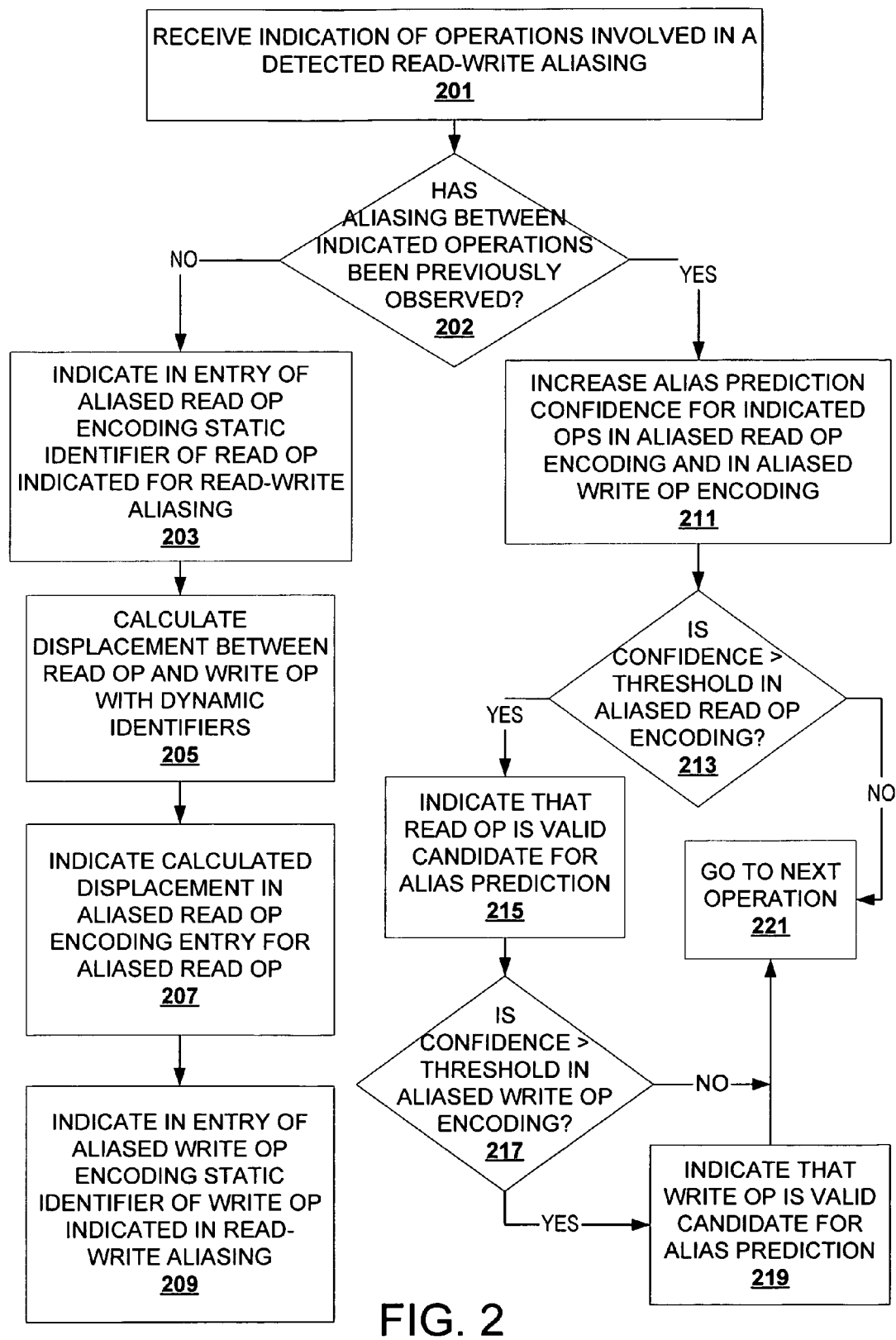
FIG. 2 depicts an exemplary flowchart for tracking operations indicated as aliasing.

FIG. 2 depicts an exemplary flowchart for tracking operations indicated as aliasing. At block 201, an indication of operations involved in a detected read-write aliasing is received. The indication of operations identifies the operations with their static identifiers (e.g., program counter) and their dynamic identifiers (e.g., rename identifier). Various techniques communicate an operation's unique identity and accounts for the operation's changing identity over time or with respect to program execution (i.e., factors in loops, branching, etc.). At block 202, it is determined if aliasing between the indicated operations has been previously observed. If the aliasing has been previously observed between the indicated operations, then control flows to block 211. If the aliasing has not been previously observed between the indicated operations, then control flows to block 203.

At block 203, the static identifier and the dynamic identifier of the indicated read operation is indicated in an entry of an aliased read operation encoding. For example, an entry in the aliased read operation encoding 105, which is indexed by program counter, is updated with the program counter of a read operation indicated by the data hazard detection module 103 of FIG. 1. At block 205, the execution displacement between the read operation and the write operation is calculated with their dynamic identifiers. At block 207, the calculated displacement is indicated in the aliased read operation encoding entry for the indicated read operation. At block 209, the static identifier of the aliased write operation is indicated in an entry of an aliased write operation encoding. For example, the aliased write operation encoding 111 of FIG. 1 is updated to indicate an aliased write operation indicated by the data hazard detection module 103.

At block 211, an alias prediction confidence value for the detected aliased read operation is increased in the aliased read operation encoding and an alias prediction confidence value for the corresponding write operation is increased in the aliased write operation encoding. At block 213, it is determined if the increased alias prediction confidence value of the aliased read operation encoding is greater than a threshold. Various factors, such as cost of a misprediction and optimization benefits, influence the threshold. An environment with a comparatively low misprediction cost may have threshold set lower than an environment with substantial misprediction cost. If the alias prediction confidence is greater than the threshold, then control flows to block 215. If the alias prediction confidence is less than or equal to the threshold, then control flows to block 221.

At block 215, the detected aliased read operation is indicated as a valid candidate for read-write alias prediction in the aliased read operation encoding. At block 217, it is determined if the alias prediction confidence value of the aliased write operation encoding is greater than a threshold. The threshold for the aliased write operation encoding may be the same or different as the threshold for the aliased read operation encoding. If the alias prediction confidence value is greater than the threshold, then control flows to block 219. If the alias prediction confidence value is not greater than the threshold, then control flows to block 221. At block 219, the detected aliased write operation is indicated as a valid candidate for read-write alias prediction in the aliased write operation encoding.

At block 221, processing proceeds to the next operation.

Manipulation of values in the different encodings may be performed differently than illustrated in FIG. 2. For example, blocks 213 and 215 may be performed in parallel with blocks 217 and 219; blocks 217 and 219 may precede blocks 213 and 215, etc. In addition, increasing the alias prediction confidence value in the different encodings may be performed in different blocks rather than in a single block as in block 211. Moreover, manipulation of values varies in different realizations of the invention. For example, the operations illustrated in FIG. 2 may be different for various implementations of the encodings. An alias prediction confidence value and valid indication may not be maintained for the aliased write operation encoding. The alias prediction confidence value and the valid indication may be shared between the aliased write operation encoding and the aliased read operation encoding.

Figure 3:
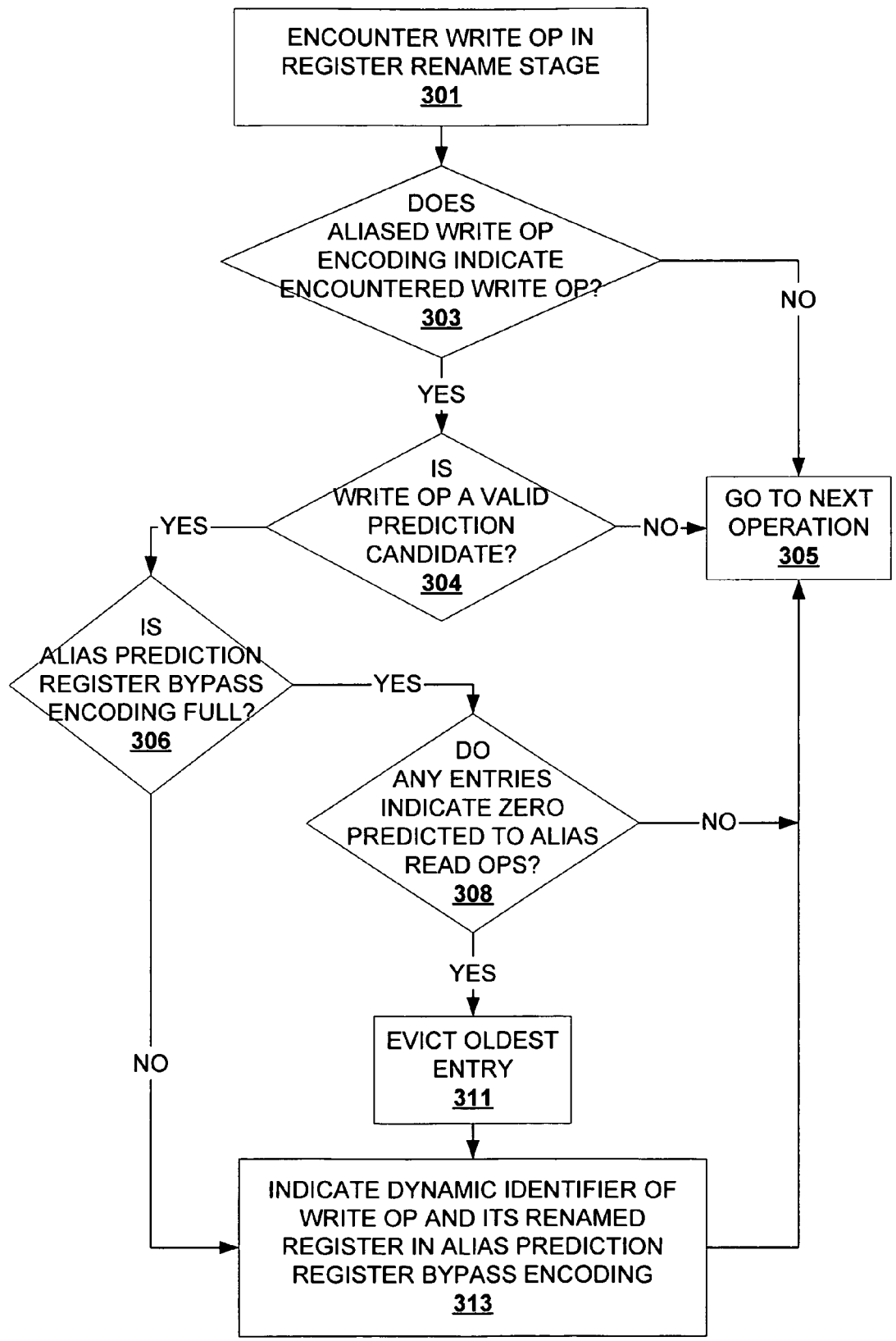
FIG. 3 depicts an exemplary flowchart for processing a write operation.

FIG. 3 depicts an exemplary flowchart for processing a write operation. At block 301, a write operation (e.g., a store instruction, a store multiple instruction, a store halfword instruction, a store float instruction, a store byte instruction, a store double instruction, etc.) is encountered at the rename stage (e.g., in an operation rename unit). At block 303, it is determined if an aliased write operation encoding indicates the encountered read operation. For example, the aliased write operation encoding 111 is searched for the write operation's static identifier. If the aliased write operation encoding indicates the encountered write operation, then control flows to block 304. If the aliased write operation encoding does not indicate the encountered write operation, then control flows to block 305.

At block 305, operation processing proceeds to the next operation.

At block 304, it is determined if the aliased write operation is a valid prediction candidate. If the aliased write operation is a valid prediction candidate, then control flows to block 306. If the aliased write operation is not a valid prediction candidate, then control flows to block 305.

At block 306, it is determined if an alias prediction register bypass encoding is full. If the alias prediction register bypass encoding is full, then control flows to block 308. If the alias prediction register bypass encoding is not full, then control flows to block 313. Various techniques are used in various realizations of the invention to maintain the alias prediction register bypass encoding (e.g., periodic eviction of entries, eviction of entries upon migration to a different section of the executing program, etc.).

At block 308, it is determined if any entries in the alias prediction register bypass encoding indicate zero predicted to alias read operations (i.e., if there are any entries for write operations without any pending predicted to alias read operations). If there are no such entries, then control flows to block 305. If there are such entries, then control flows to block 311. At block 311, the entry in the alias prediction register bypass encoding with the oldest operation is evicted. Age of operations in the alias prediction register bypass encoding can be indicated with different techniques (e.g., the entry with the lowest dynamic identifier hosts the oldest operation). At block 313, the dynamic identifier of the write operation and its renamed register (i.e., working register) are indicated in the alias prediction register bypass encoding.

Figure 4A:
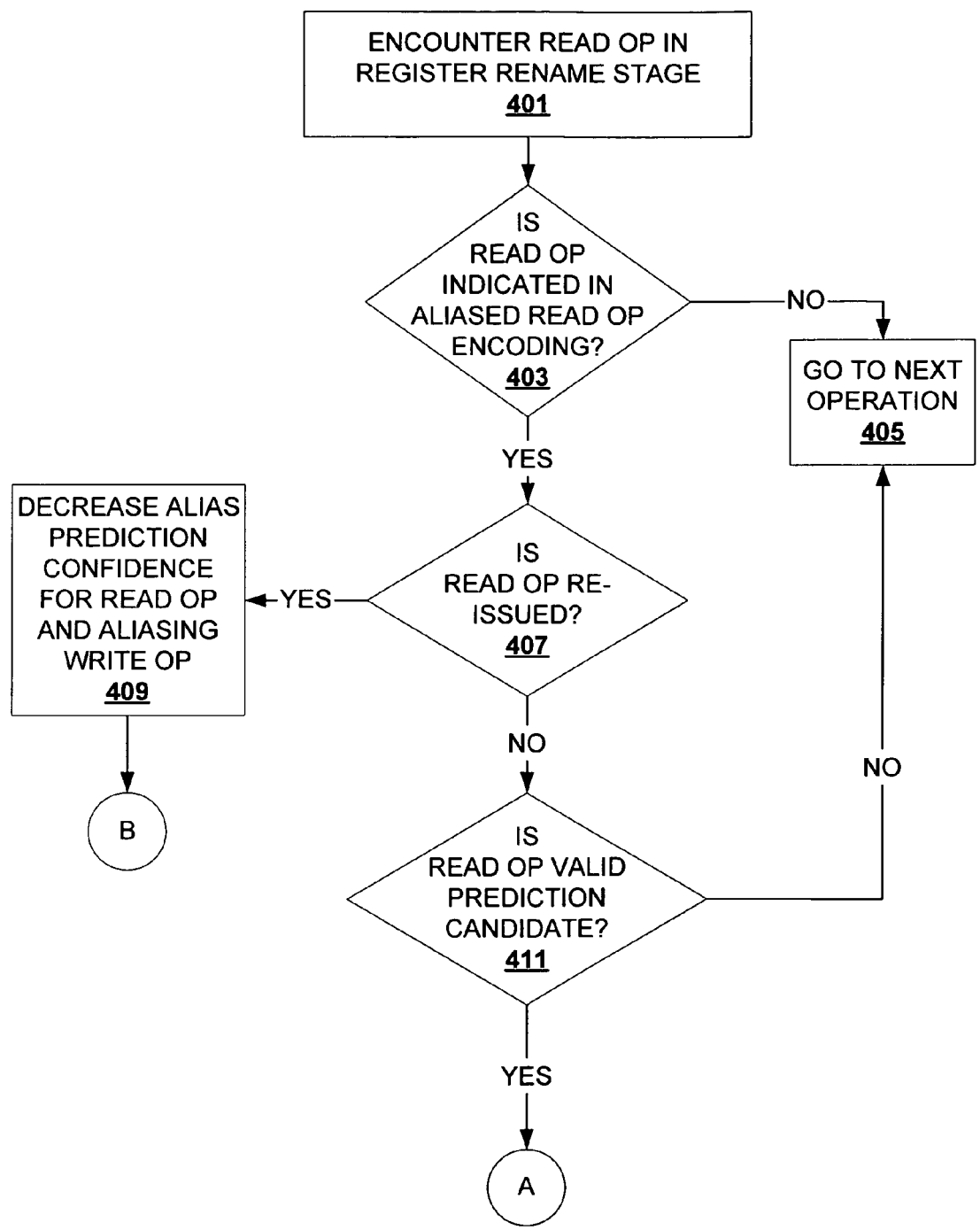
FIGS. 4A-4B depict exemplary flowcharts for processing a read operation.
Figure 4B:
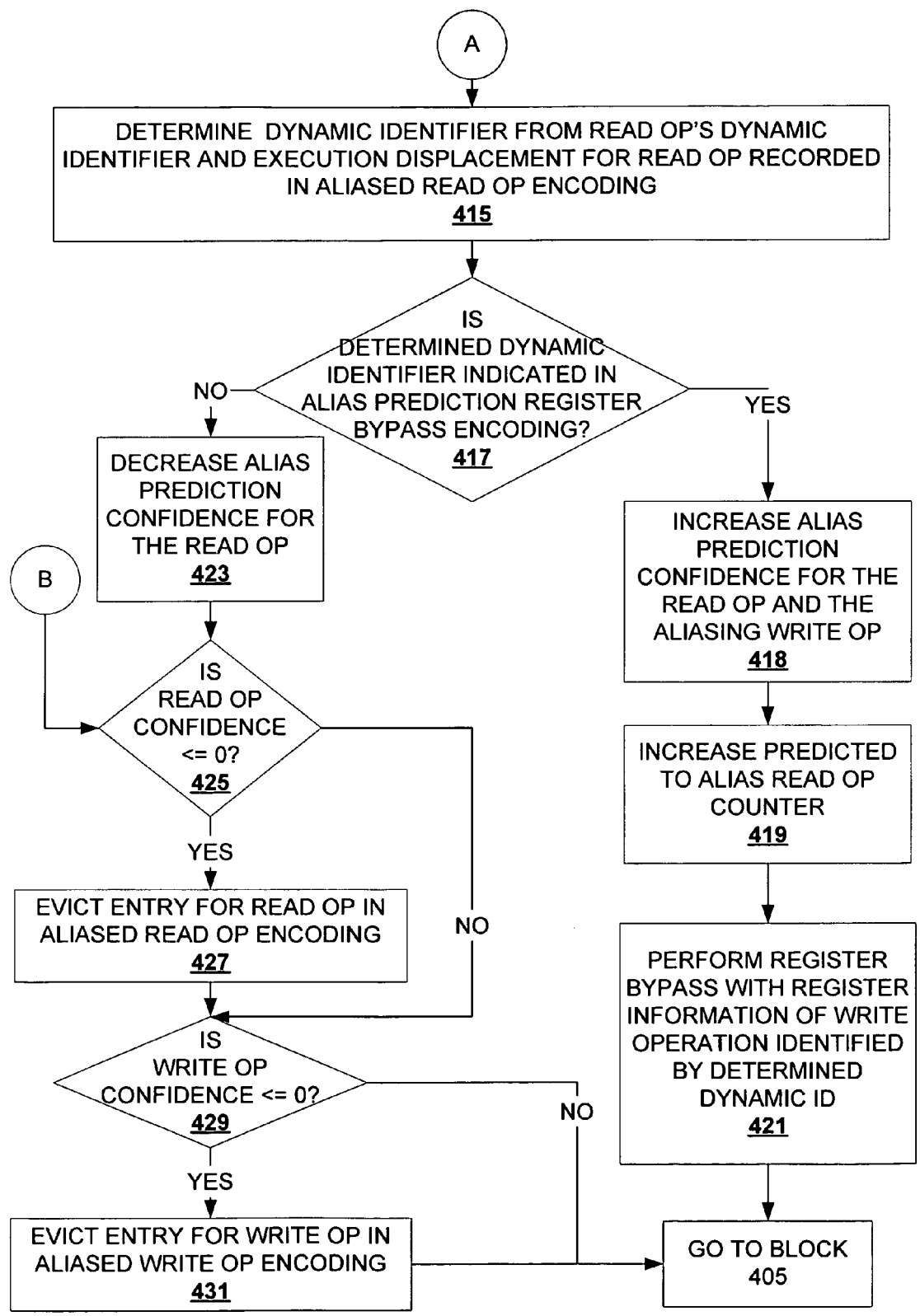

FIGS. 4A-4B depict exemplary flowcharts for processing a read operation. FIG. 4A depicts an exemplary flowchart for processing a read operation. At block 401, a read operation (e.g., a load instruction, a load multiple instruction, a load halfword instruction, a load float instruction, a load byte instruction, a load double instruction, etc.) is encountered at the rename stage (e.g., in an operation rename unit). At block 403, it is determined if the read operation is indicated in the aliased read operation encoding. If the read operation is indicated in the aliased read operation encoding, then control flows to block 407. If the read operation is not indicated in the aliased read operation encoding, then control flows to block 405.

At block 405, processing proceeds to the next operation.

At block 407, it is determined if the read operation is re-issued. If the read operation is re-issued, then control flows to block 409. If the read operation is not re-issued, then control flows to block 411.

At block 409, the alias prediction confidence for the read operation and the aliasing write operation is decreased. For example, both the alias prediction confidence value for the read operation's entry in the aliased read operation encoding and the alias prediction confidence value for the aliasing write operation's entry in the aliased write operation encoding are decreased. An environment may decrease the alias prediction substantially to reflect the misprediction that resulted in the re-issuance. In addition, the alias prediction confidence for the read operation may be decreased differently (e.g., a greater decrease) than for the aliasing write operation, if separate alias prediction confidence is maintained. Control flows from block 409 to block 425.

At block 411, it is determined if the read operation is a valid prediction candidate. For example, the aliased read operation encoding 105 is queried to determine if a valid bit has been set for the corresponding read operation. If the read operation is not a valid alias prediction candidate, then control flows to block 405. If the read operation is a valid alias prediction candidate, then control flows to block 415.

FIG. 4B continues from FIG. 4A. At block 415, a dynamic identifier for a potential aliasing write operation is determined from the read operation's dynamic identifier and execution displacement for the read operation recorded in the aliased read operation encoding. At block 417, it is determined if the determined dynamic identifier is indicated in the alias prediction register bypass encoding. If the determined dynamic identifier is indicated in the alias prediction register bypass encoding, then control flows to block 418. If the determined dynamic identifier is not indicated in the alias prediction register bypass encoding, then control flows to block 423.

At block 423, the alias prediction confidence for the read operation is decreased. For example, the alias prediction confidence value of the read operation's entry in the aliased read operation encoding is decreased. The amount of decrease at block 423 and at block 409 may be the same different, dynamically changing with program execution, etc. At block 425, it is determined if the alias prediction confidence for the read operation is less than or equal to zero. If the alias prediction confidence for the read operation is less than or equal to zero, then control flows to block 427. If the alias prediction confidence for the read operation is greater than zero, then control flows to block 429.

At block 427, the entry for the read operation is evicted from the aliased read operation encoding. At block 429, it is determined if the alias prediction confidence for the write operation is less than or equal to zero. If the alias prediction confidence for the write operation is less than or equal to zero, then control flows to block 431. If the alias prediction confidence for the write operation is greater than zero, then control flows to block 405. At block 431, the entry for the write operation is evicted from the aliased write operation encoding. The order of operations in FIG. 4B is only illustrative and not meant to be limiting upon the invention. For example, blocks 429 and 431 may be performed prior to block 425 and 427; blocks 429 and 431 may be performed in parallel with blocks 425 and 427; blocks 429 and 425 may be performed atomically; blocks 427 and 431 may be performed atomically; etc.

At block 418, the alias prediction confidence for the read operation and the aliasing write operation is increased. For example, both the alias prediction confidence value for the read operation's entry in the aliased read operation encoding and the alias prediction confidence value for the aliasing write operation's entry in the aliased write operation encoding are increased. At block 419, a predicted to alias read operation counter is increased. For example, the alias prediction register bypass encoding 113 may include a field for counting the number of read operations predicted to alias with an indicated write operation. At block 421, register bypass is performed with register information of the write operation identified by the determined dynamic identifier.

Various realizations of the invention may perform register bypass differently. For example, a memory RAW alias detected by a data hazard detection module may be converted to a register RAW alias. The aliased read operation is replaced with move or copy operations and an operation to verify accuracy of the alias prediction is inserted into the operation sequence. Various techniques can be implemented to maintain identifiers when an instruction is replaced with helper operations, optimizing operations, etc. For example, additional identifiers are assigned to each instruction after rename but before issue and the new identifier is mapped to the rename identifier; rename identifiers are reassigned if an instruction is replaced and/or split; etc. To bypass the value of the predicted to alias write operation to the relevant read operation, data from the data destination of the write operation is copied or moved to the data source of the read operation. For instance, assume a predicted to alias read operation and write operation access different sets of working registers (e.g., the write operation accesses an integer register and the read operation accesses a floating point register). The read operation would be replaced with an integer-to-floating point move operation. Numerous other scenarios involve replacing a predicted to alias read operation with an integer-to-integer move operation, a floating point-to-floating point move operation, a floating point-to-integer move operation, etc.

In another example, register bypass is performed with implicit copying of data. Instead of replacing the predicted to alias read operation with a move or copy operation, the register mapping is set to associate the architectural data destination register of the read operation to the working data source register of the write operation, and the predicted to alias read operation is replaced with one or more operations to verify the prediction. Subsequent operations dependent on the replaced read operation destination register will reference the write operation's working source register after renaming.

Various techniques may be employed to prevent register reclamation from interfering with register mappings from bypass. Typically, the register mapping is accessed using the architectural register identifier. Modifying the register mapping to be accessible (e.g., associatively accessed) with working register identifiers, ensures that redefinition of associated architectural registers occurs before working register reclamation. Before a working register is scheduled for reclamation, the register mapping is searched with the working register identifier to determine any other register associations. If there are no other architectural registers associated with the working register, then the working register can be reclaimed. If there are other architectural registers associated with the working register, then reclamation is temporarily prevented. Another technique to avoid reclamation of a working register with additional register associations, maintains a reference count for each working register in a register map. When the reference count for a working register reaches zero, then the working register can be scheduled for reclamation. Another technique implements a priority scheme that gives priority to predicted to alias write operations and delays reclamation of working registers corresponding to the write operations.

Operations consuming the result of the removed read operation can issue as soon as the operation that generates the value to be written is issued. In addition, since the read-write aliasings are predicted, the operations dependent on the read operation can issue before the predicted to alias write operation issues, thus achieving a negative bypass latency.

FIGS. 5A-5D depict exemplary illustrations of encodings being updated with execution of a loop. The exemplary illustration is meant to aid in understanding the invention and not meant to be limiting upon the invention. FIG. 5A depicts updating of encodings with respect to a third loop iteration. An operation queue 501 includes the following operation sequence:

| 155 | 67 | load [r6], r1 |
| 156 | 68 | Add r1, r2, r3 |
| 157 | 69 | store r3, [r6+8] |
| 158 | 70 | Add r4, 1, r4 |
| 159 | 71 | Add r6, 4, r6 |
| 160 | 72 | compare r4, r5 |
| 161 | 73 | branchOnNotEqual 155 |

The operation sequence has already executed twice and, after the third iteration, an inter-loop iteration RAW alias will be detected between the load operation 155 and the store operation 157 (i.e., the RAW alias was detected between the load operation 155 of the third iteration and the store operation 157 of the first iteration. After the aliasing is detected, an aliased read operation encoding 503 is updated to indicate the load operation 155 with an execution displacement of 12, based on the difference between the dynamic identifier 67 for the load operation in the third iteration and the dynamic identifier 55 of the store operation in the first loop iteration. A static identifier field of an aliased write operation encoding 505 is updated to indicate the corresponding aliasing store 157. Alias prediction confidence fields of the aliased read operation encoding 503 and the aliased write operation encoding 505 are incremented.

FIG. 5B continues the exemplary illustration and illustrates results of a fifth loop iteration. After a few loop iterations, additional alias indications have been received for the load operation 155 and the store operation 157 with the same displacement of 12. The alias prediction confidence field of the aliased write operation encoding 505 has been incremented to 3 as a result of the repeated alias detections. The validity threshold for write operations is set lower than the validity threshold for read operations. Having a lower threshold than read operations allows the alias prediction register bypass encoding 507 to be primed for the read operations. Prior to the fifth iteration, a detected aliasing between the store operation 157 and the load operation 155 has caused the alias prediction confidence field of the aliased write operation encoding 505 to be incremented to 2. Assuming the write operation threshold is set to 1, then exceeding the threshold causes the alias prediction validity field of the aliased write operation encoding 505 to be set to indicate alias prediction candidacy. Assuming such an alias detection occurs after the fourth iteration, then in the fifth iteration, the alias prediction register bypass encoding 507 is modified. The load operation is encountered in the fifth iteration, but its corresponding entry in the aliased read operation encoding 503 is not valid for alias prediction yet. However, the store operation is encountered and its corresponding entry in the aliased write operation encoding 505 is valid. Since the entry indicates alias prediction validity, then an entry is created in the alias prediction register bypass encoding 507. The entry indicates the store operation's dynamic identifier of 83, and its corresponding working register, which in this illustration is p3.

FIG. 5C continues the exemplary illustration and illustrates results of a sixth loop iteration. In the seventh iteration, the load operation 155 hits in the alias read operation encoding 503. Prior to the seventh iteration, the load operation's corresponding entry in the aliased read operation encoding 503 has been modified to indicate alias prediction validity, assuming the threshold for read operations is set to 3. An alias detection after the sixth iteration causes the confidence field to exceed the threshold and the validity to change. To this point, the load operation has hit in the aliased read operation encoding 503, but the alias prediction validity field prevented register bypass alias prediction. Since the load operation is a valid alias prediction candidate, the result of reducing its dynamic identifier 95 by the execution displacement indicated in the corresponding entry (12) attains a result of 83. The alias prediction register bypass encoding 507 is searched for a dynamic identifier 83. The dynamic identifier 83 hits in the encoding 507. The renamed register p3 is retrieved from the encoding 507 for register bypass and the predicted to alias read operation counter field is incremented. If there is a misprediction or after retirement of relevant instances of the store operation, the predicted to alias read operation counter field is decremented. In the seventh loop iteration, the store operation is encountered and an entry for the new dynamic identifier 97 is installed.

FIG. 5D continues the exemplary illustration and illustrates results of a thirtieth loop iteration. Each time the load operation has been predicted to alias, the alias prediction confidence field of the corresponding entry has been incremented in the aliased read operation encoding 501 and the aliased write operation encoding (assuming there have not been any mispredictions). In the thirtieth loop iteration, the alias prediction confidence field is incremented to 29. When the load operation hits in the aliased read operation encoding 503, the dynamic identifier 251 is determined (263–12), and looked up in the alias prediction register bypass encoding 507. Information from the entry is utilized to perform register bypassing for the load operation. Also in the thirtieth loop iteration, the store operation causes an entry in the alias prediction register bypass encoding 507 to be evicted and overwritten with its newest dynamic identifier 265, assuming the entry was not pending alias prediction verification. The eviction technique relates to the size of the alias prediction register bypass encoding 507 and/or implemented eviction techniques (e.g., elapse of time period, scans for entries with zero pending load operations, entry is not evicted until its pending predicted to alias counter is decremented to zero, etc.).

Figure 6:
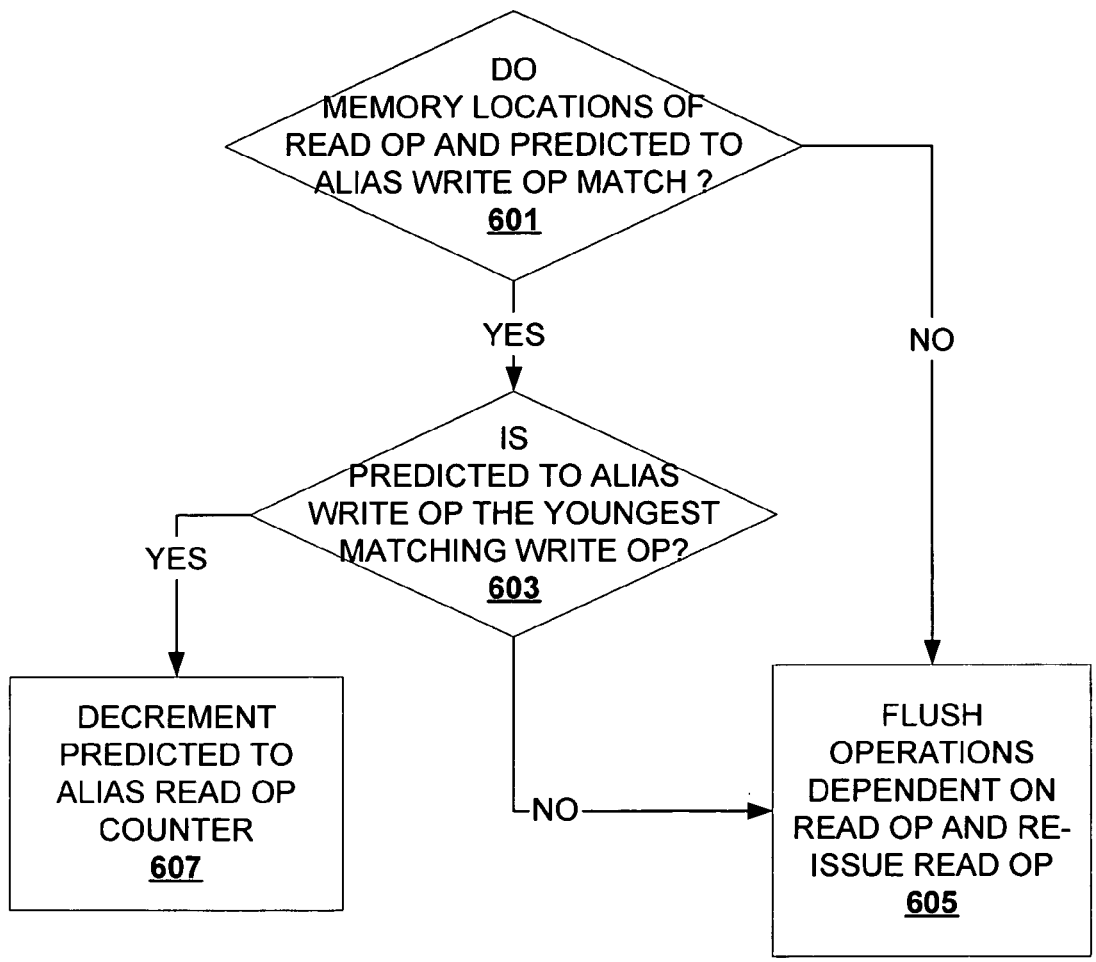
FIG. 6 depicts an exemplary flowchart for verifying an execution displacement alias prediction.

FIG. 6 depicts an exemplary flowchart for verifying an execution displacement alias prediction. At block 601, it is determined if the memory locations of a predicted to alias read operation and the corresponding write operation overlap. If the memory locations overlap, then control flows to block 603. If the memory locations do not overlap, then control flows to block 605.

At block 605, operations dependent on the read operation are flushed and the read operation is re-issued.

At block 603, it is determined if the predicted to alias write operation is the youngest matching write operation (i.e., verify the absence of intervening write operations). If the write operation is not the youngest write operation, then control flows to block 605. If the write operation is the youngest write operation, then control flows to block 607.

Various techniques can be employed to verify an execution displacement alias prediction. For example, a loadCheck operation can be inserted into an operation sequence (e.g., replacing a predicted to alias read operation). The loadCheck operation interrogates a data hazard detection module (e.g., a memory disambiguation buffer, a load store queue, etc.) to ascertain that the memory locations of the predicted to alias operations match and to ascertain that there are no intervening write operations. An exemplary implementation of the loadCheck operation uses the memory location of the read operation and the dynamic identifier of the write operation. The data hazard detection module uses the write operation dynamic identifier to determine the write operation's memory location and compares it with the load operation's memory location. In addition, the dynamic identifier of the replaced read operation identifies the loadCheck operation. Hence, the dynamic identifier of the loadCheck operation can be utilized as the original read operation's dynamic identifier along with the write operation's dynamic identifier to determine if there are any intervening write operations to the same memory location.

At block 607, the predicted to alias read operation counter is decremented. The predicted to alias read operation counter is utilized for retirement of the corresponding write operation. Various realizations of the invention employ the predicted to alias read operation counter differently (e.g., if a counter is decremented to zero, then the write operation is prepared for retirement; when a write operation is queued for retirement, the predicted to alias read operation counter is consulted to determine whether the operation can retire or should be prevented from retiring; etc.).

While the flow diagram shows a particular order of operations performed by certain realizations of the invention, it should be understood that such order is exemplary (e.g., alternative realizations may perform the operations in a different order, combine certain operations, overlap certain operations, perform certain operations in parallel, etc.). For example, blocks 203 and 205 may be performed in parallel. In FIG. 4, blocks 418, 419, and 421 may be performed in various sequences, in parallel, etc. The alias prediction confidence can be incremented upon verification of a prediction in FIG. 6 instead of at block 418 of FIG. 4A.

Figure 7:
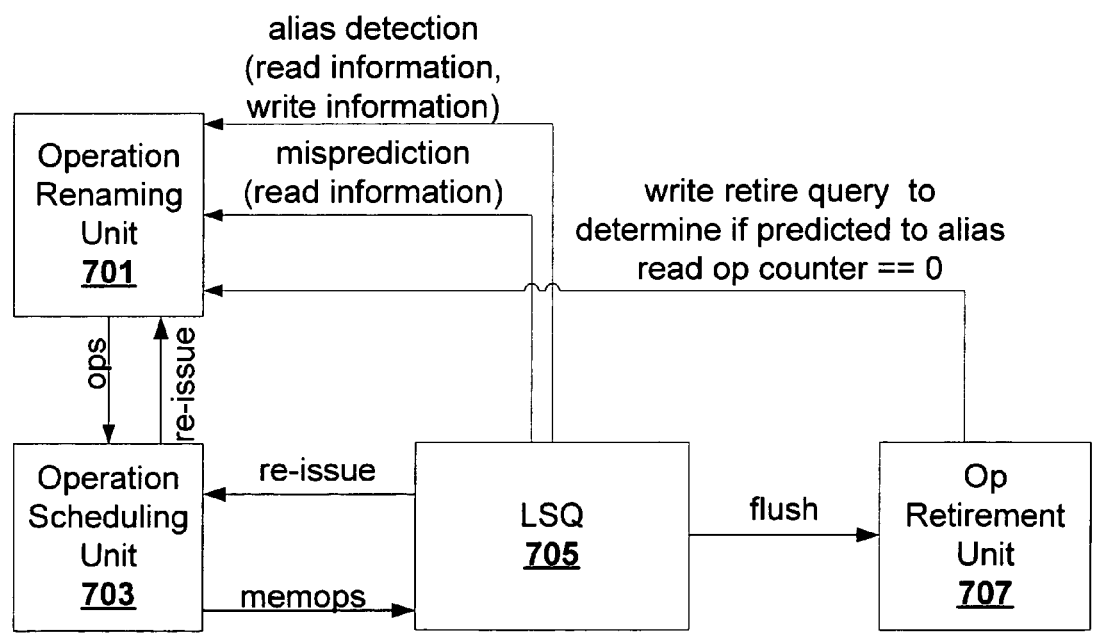
FIG. 7 depicts exemplary processor blocks that predict aliasing and verify predicted aliasing.

FIG. 7 depicts exemplary processor blocks that predict aliasing and verify predicted aliasing. An operation rename unit 701 is coupled with an operation scheduling unit 703, load store queue (LSQ) 705, and an operation retirement unit 707. Although the exemplary processor illustrated in FIG. 7 includes load store queue, realizations may include other data hazard detection units, such as a memory disambiguation buffer. Various realizations of the invention may include fewer or additional components not illustrated in FIG. 7. For example, the operation renaming unit may be preceded by one or more components that fetch and decode operations. The operation rename unit 701 issues operations to the operation scheduling unit 703. The operation scheduling unit 703 schedules and passes memory operations to the LSQ 705. The LSQ 705 sends re-issue signals to the operation scheduling unit 703 if necessary. The LSQ 705 sends alias detection signals, which indicate write and read operation information, and misprediction signals that identify the relevant read operation to the operation rename unit 701. The LSQ 705 also sends flush signals to the operation retirement unit 707. The operation retirement unit 707 provides a write retire query to determine if a corresponding predicted to alias read operation counter is equal to zero. In another example, the operation renaming unit 701 sends signals to the operation retirement unit 707 to indicate when a write operation can be retired in accordance with the corresponding predicted to alias read operation counter.

The described invention may be provided as a computer program product, or software, that may include a machine-readable medium having stored thereon instructions, which may be used to program a computer system (or other electronic devices) to perform a process according to the present invention. A machine readable medium includes any mechanism for storing or transmitting information in a form (e.g., software, processing application) readable by a machine (e.g., a computer). The machine-readable medium may include, but is not limited to, machine-readable storage mediums and machine-readable transmission mediums. The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); and flash memory; or other types of medium suitable for storing electronic instructions. The machine-readable transmission medium may include, but is not limited to, electrical, optical, acoustical or other form of propagated signal (e.g., carrier waves, infrared signals, digital signals, etc.).

Figure 8:
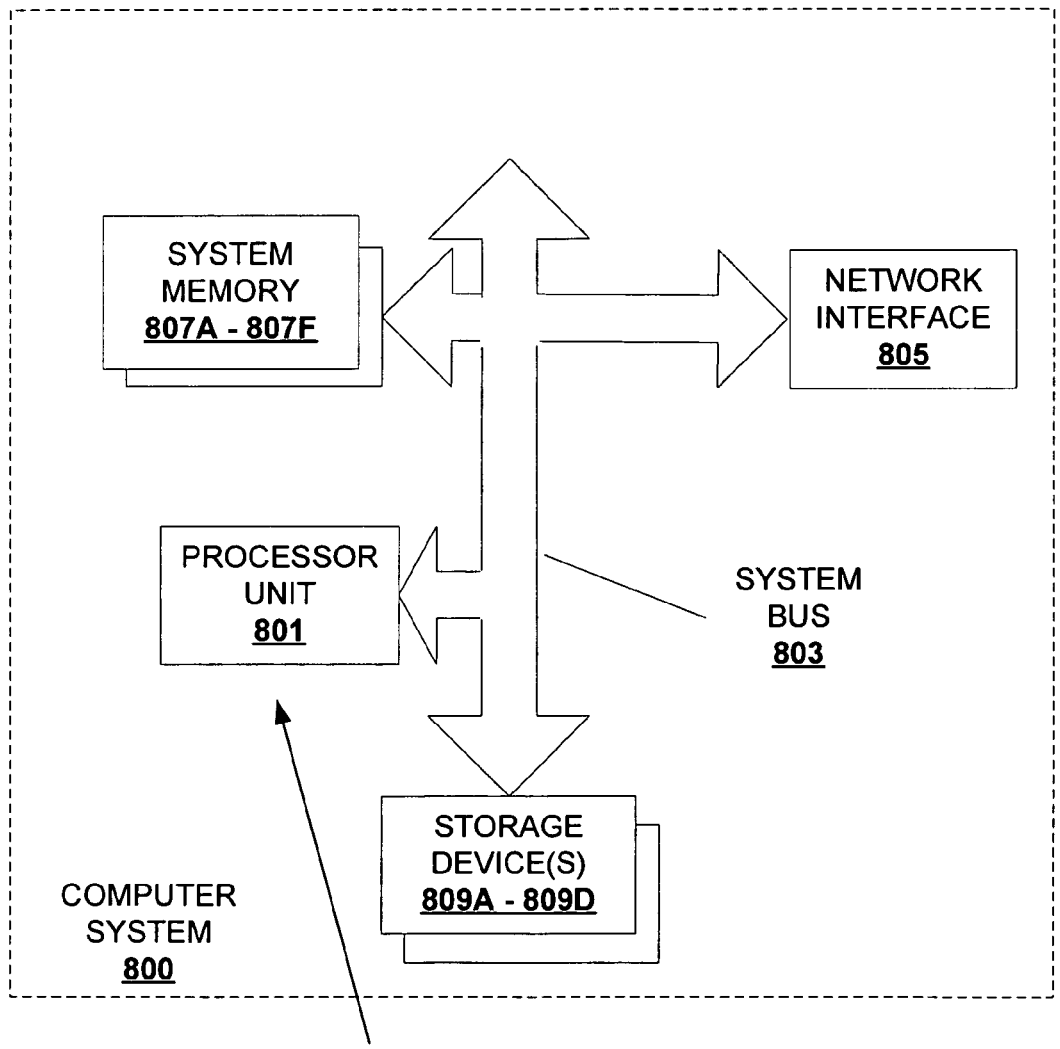
FIG. 8 depicts an exemplary computer system according to realizations of the invention.

FIG. 8 depicts an exemplary computer system according to realizations of the invention. A computer system 800 includes a processor unit 801 (possibly including multiple processors). The computer system 800 also includes a system memory 807A-807F (e.g., one or more of cache, SRAM DRAM, RDRAM, EDO RAM, DDR RAM, EEPROM, etc.), a system bus 803 (e.g., LDT, PCI, ISA, etc.), a network interface 805 (e.g., an ATM interface, an Ethernet interface, a Frame Relay interface, etc.), and a storage device(s) 809A-809D (e.g., optical storage, magnetic storage, etc.). Realizations of the invention may include fewer or additional components not illustrated in FIG. 8 (e.g., video cards, audio cards, additional network interfaces, peripheral devices, etc.). The processor unit 801, the storage device(s) 809A-809D, the network interface 805, and the system memory 807A-807F are coupled to the system bus 803. The processor unit 801 includes an alias predictor, which includes one or more encodings, such as those previously described, for execution displacement alias prediction and corresponding logic (e.g., to maintain the encodings, to make alias predictions based on the encodings, etc.).

While circuits and physical structures are generally presumed, it is well recognized that in modern semiconductor and design fabrication, physical structures and circuits may be embodied in computer readable descriptive form suitable for use in subsequent design, test, or fabrication stages as well as in resultant fabricated semiconductor integrated circuits. Accordingly, claims directed to traditional circuits or structure may, consistent with particular language thereof, read upon computer readable encodings and representations of same, whether embodied in media or combined with suitable reader facilities to allow fabrication, test, or design refinement of the corresponding circuits and/or structures.

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. For example, the blocks and logic units identified in the description are for understanding the described invention and not meant to limit the described invention. Functionality may be separated or combined in blocks differently in various realizations of the invention or described with different terminology. For example, an operation fetch unit may be referred to as an instruction fetch unit, an instruction buffer may perform some or all of the functionality of the operation fetch unit, the operation scheduling unit, and/or the renaming unit, etc.

These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A processor that predicts aliasing between read type instructions and write type instructions based at least in part on respective displacements between the read type and write type instructions and on previous detection of respective aliasings between the read type instructions and the write type instructions, and that bypasses data from the write type instructions to the corresponding predicted to alias read type instructions using register information of the aliasing write type instructions.

2. The processor of claim 1 wherein the data is bypassed if a threshold number of repeated aliases are detected.

3. The processor of claim 1 that includes encodings of read type instruction information, write type instruction information, and repeat aliasing.

4. The processor of claim 3 wherein the encodings comprise:
   a read type instruction aliasing predictor table that indicates a static instruction identifier for a read type instruction, a displacement between the indicated read type instruction and a previously aliased write type instruction, and an alias prediction confidence indicator that indicates confidence of alias predictions;
   a write type instruction aliasing predictor table that indicates the static instruction identifier for a write type instruction; and
   an aliasing predictor management table that indicates a rename register identifier, an alias prediction counter that indicates a number of alias predictions, and a dynamic instruction identifier.

5. The processor of claim 4 wherein the static instruction identifier includes an address for the read or write-type instruction.

6. The processor of claim 4 wherein the dynamic instruction identifier monotonically increases with execution of a program that includes the instructions.

7. The processor of claim 4 that reduces the alias confidence prediction indicator for a read type instruction indicated in the read type instruction aliasing predictor table if the aliasing predictor management table does not indicate a write type instruction that corresponds to the read type instruction and the read type instruction's corresponding displacement.

8. The processor of claim 4 that reduces the alias confidence prediction indicator for a read type instruction indicated in the read type instruction aliasing predictor table if a misprediction of the read type instruction occurs.

9. The processor of claim 4 wherein the read type instruction aliasing predictor table includes a validity flag that indicates whether a threshold number of aliasings have been detected.

10. The processor of claim 1 wherein data bypasses comprise the processor substituting a register move instruction for the read type instruction.

11. The processor of claim 10, wherein a loadCheck instruction is inserted, which when executed by the processor, causes the processor to verify the predicted aliasing.

12. The processor of claim 10 wherein the register move instruction includes an integer-to-integer move instruction, a floating point-to-floating point move instruction, an integer-to-floating point move instruction, and a floating point-to-integer move instruction.

13. The processor of claim 1 wherein data bypasses comprise the processor mapping the read type instruction's destination register to the write type instruction's source register.

14. The processor of claim 13 that replaces the read type instruction with a loadCheck instruction, which when executed by the processor, causes the processor to verify the predicted aliasing.

15. The processor of claim 14 wherein the processor's verification of the predicted aliasing comprises interrogation of a data hazard detection module to ascertain whether addresses of the predicted to alias write type instruction and the read type instruction match, and verification of absence of intervening matching write type instructions.

16. A method comprising:
   in a register rename stage, tracking a write type instruction and a read type instruction, instances of which have previously been indicated as aliased;
   predicting a current instance of the read type instruction will alias with a current instance of the write type instruction when displacement between the current instance of the read type instruction and the current instance of the write type instruction matches displacement between previous aliased instances of the read type instruction and write type instruction; and
   bypassing data of the write type instruction to the read type instruction with register information of the write type instruction.

17. The method of claim 16 wherein the displacement is measured with dynamic instruction identifiers, wherein the dynamic instruction identifiers identify corresponding instances of instructions with respect to program execution.

18. The method of claim 16 wherein the write type instruction and the read type instruction are tracked with their static identifier, wherein the static identifier identifies an instruction in a program and remains static during program execution.

19. The method of claim 18 wherein the static identifier includes an instruction address.

20. The method of claim 16 wherein a read type instruction includes a load instruction, a load halfword instruction, a load byte instruction, a load float instruction, a load double instruction, and a load multiple instruction.

21. The method of claim 16 wherein the write type instruction includes a store instruction, a store byte instruction, a store float instruction, a store double instruction, a store multiple instruction, and a store halfword instruction.

22. The method of claim 16 wherein bypassing comprises mapping the read type instruction's destination register to the write type instruction's source register.

23. The method of claim 22 further comprising replacing the read type instruction with a loadCheck instruction, wherein the loadCheck instruction causes interrogation of a data hazard detection module to ascertain whether addresses of the write type instruction and the read type instruction predicted to alias with the write type instruction match, and to ascertain whether there are any intervening matching write type instructions.

24. The method of claim 16 wherein bypassing comprises converting the read type instruction to a register move instruction.

25. The method of claim 24 further comprising inserting a loadCheck instruction, wherein the loadCheck instruction causes interrogation of a data hazard detection logic to ascertain whether addresses of the write type instruction and the read type instruction predicted to alias with the write type instruction match, and to ascertain whether there are any intervening matching write type instructions.

26. The method of claim 16 embodied as a computer program product encoded in one or more machine-readable storage media.

27. A method comprising:
observing repeated aliasing between instances of a write type instruction and a read type instruction based at least in part on static identifiers of the instructions;
determining a displacement between the aliasing instances of the write type instruction and the read type instruction based on dynamic identifiers of the instruction instances;
predicting aliasing between a current instance of the read type instruction as identified by the static identifier thereof and a subsequent instance of the write type instruction identified with a dynamic identifier determined with a dynamic identifier of the current instance of the read type instruction and the displacement; and
bypassing data of the subsequent instance of the write type instruction to the current instance of the read type instruction with register information of the subsequent instance of the write type instruction.

28. The method of claim 27 wherein bypassing the data comprises mapping the data destination of the current instance of the read type instruction to the data source of the subsequent instance of the write type instruction.

29. The method of claim 28 further comprising substituting a loadCheck instruction for the current instance of the read type instruction, wherein execution of the loadCheck instruction causes interrogation of a data hazard detection module to ascertain whether addresses of the current instance of the read type instruction and the subsequent instance of the write type instruction match.

30. The method of claim 29 wherein execution of the loadCheck instruction further causes verifying the absence of intervening matching write type instructions.

31. The method of claim 27 wherein bypassing the data comprises substituting a register move instruction for the read type instruction, wherein the move instruction moves data from the data source of the write type instruction to the data destination of the read type instruction.

32. The method of claim 27 wherein the dynamic identifiers monotonically increase with execution of a program that includes the instructions.

33. The method of claim 27 wherein the static identifiers include instruction addresses.

34. The method of claim 27 wherein the aliasing is predicted if the number of observed repeat aliasings exceeds a threshold.

35. The method of claim 27 embodied as a computer program product encoded in one or more machine-readable storage media.

36. A method comprising:
detecting aliasing between a first instance of a read type instruction and a first instance of a write type instruction;
determining displacement between the first instance of the read type instruction and the first instance of the write type instruction, wherein the displacement is with respect to program execution;
observing repeated aliasing between subsequent instances of the read type instruction and the write type instruction;
selecting a current instance of the write type instruction based at least in part on the displacement and a current instance of the read type instruction; and
bypassing data from a data source of the current instance of the write type instruction to a data destination of the current instance of the read type instruction.

37. The method of claim 36 further comprising verifying that the current instance of the write type instruction aliases with the current instance of the read type instruction.

38. The method of claim 36 wherein data bypass comprises changing the current instance of the read type instruction to a register move instruction.

39. The method of claim 38 further comprising inserting a loadCheck instruction, wherein the loadCheck instruction causes verification that the current instance of the read type instruction and the current instance of the write type instruction alias and verification of the absence of one or more intervening write type instructions.

40. The method of claim 36 wherein data bypasses comprise mapping the current instance of the read type instruction's architectural destination register to the current instance of the write type instruction's rename source register.

41. The method of claim 40 further comprising changing the current instance of the read type instruction to a loadCheck instruction, wherein the loadCheck instruction causes verification that the current instances of the read type instruction and the write type instruction alias and verification of the absence of one or more intervening write type instructions.

42. The method of claim 36 wherein the instances of the write type instruction have a same static identifier and different dynamic identifiers.

43. The method of claim 42 wherein the static identifiers include instruction addresses.

44. The method of claim 36 wherein the displacement is based at least in part on the dynamic identifiers of the instruction instances, wherein the dynamic identifiers monotonically increase with execution of a program that includes the instructions.

45. The method of claim 36 embodied as a computer program product encoded in one or more machine-readable storage media.

46. A computer program product encoded in one or more machine-readable storage media, the computer program product comprising:
a first sequence of instructions executable to, update a first encoding with a read type instruction's static identifier and a displacement between an instance of the read type instruction and an instance of a write type instruction observed as aliasing with the read type instruction instance if the read type instruction's static identifier is not indicated in the first encoding and to update the first encoding to indicate repeat aliasing if the read type instruction's static identifier is already indicated in the first encoding, update a second encoding with the write type instruction's static identifier;
a second sequence of instructions executable to update a third encoding with a dynamic identifier of an instance of a write type instruction if the static identifier thereof is indicated in the second encoding; and
a third sequence of instructions executable to bypass data from an instance of a write type instruction to an instance of a read type instruction with register information of the write type instruction instance based at least in part on displacement between the instances as indicated by corresponding dynamic identifiers.

47. The computer program product of claim 46 wherein data bypassing comprises the third sequence of instructions executable to map the read type instruction's destination register to the write type instruction's source register.

48. The computer program product of claim 47 wherein the read type instruction's destination register includes an architectural register and the write type instruction's source register includes a rename register.

49. The computer program product of claim 48 wherein the third sequence of instructions are further executable to re'lace the read type instruction instance with a loadCheck instruction, which when executed causes verification that the read type instruction and the write type instruction alias to the same address and verification of the absence of one or more intervening write type instructions aliasing to the same address.

50. The computer program product of claim 46 wherein bypassing data comprises the third sequence of instructions executable to replace the read type instruction with a register move instruction.

51. The computer program product of claim 50, further comprising the third sequence of instructions executable to insert a loadCheck instruction proximate with the register move instruction, wherein execution of the loadCheck instruction causes verification that the read type instruction and the write type instruction alias to the same address and verification of the absence of one or more intervening write type instructions aliasing to the same address.

52. An apparatus comprising:
a data hazard detection module; and
means for predicting aliasing between a current instance of a read type instruction and a current instance of a write type instruction based on displacement between the current instance of the instructions and displacement between previously observed aliased instances of the read type instruction and a the write type instruction.

53. The apparatus of claim 52 further comprising means for bypassing data from the write type instruction to the read type instruction with register information of the write type instruction.

54. The apparatus of claim 52 wherein the read type instruction includes a load instruction, a load halfword instruction, a load byte instruction, a load float instruction, a load double instruction, and a load multiple instruction.

55. The apparatus of claim 52 wherein the write type instruction includes a store instruction, a store byte instruction, a store float instruction, a store double instruction, a store multiple instruction, and a store halfword instruction.

56. An apparatus comprising:
a data hazard detection module; and
rename unit coupled with the data hazard detection module, the rename unit to rename registers of instructions and to predict aliasing between instances of read type instructions and instances of write type instructions based at least in part on respective displacements between the instruction instances, wherein the rename unit includes one or more structures operable to, track read type instructions indicated by the data hazard detection module as aliasing and track repeat aliasing of the tracked read type instructions, and to indicate displacements between instances of the tracked read type instructions and aliased instances of the write type instructions;
indicate write type instructions indicated by the data hazard detection module as aliasing; and
indicate instances of the write type instructions encountered in the rename unit that are indicated in the second structure.

57. The apparatus of claim 56 wherein the data hazard detection module includes a memory disambiguation buffer or a load/store.

58. The apparatus of claim 56 further comprising an instruction scheduling unit coupled with the rename unit and the data hazard detection module.

59. The apparatus of claim 56 wherein the structures include hardware tables and logical structures instantiable in memory.

60. An apparatus comprising:
an alias predictor, including one or more structures to host indications of write type instructions and particular instances of the write type instructions and read type instructions, respective execution displacements between particular instances of read and write type instructions, and register information of the particular write type instruction instances, the alias predictor operable to predict aliasings between read and write type instruction instances based, at least in part, on the structures and indications of detected aliasings between the instruction instances;
a rename unit coupled with the alias predictor, the rename unit to supply register information for write type instruction instances to the alias predictor; and
a data hazard detection unit coupled with the alias predictor, the data hazard detection unit to detect aliasing between particular instances of read and write type instructions and to indicate detected aliasings to the alias predictor.

61. The apparatus of claim 60, wherein the indications of particular instances of instructions include instruction instance addresses.

62. The apparatus of claim 61, wherein the instruction instances addresses include one or more of static identifiers and dynamic identifiers.

63. The apparatus of claim 60, wherein the structures comprise:
a first structure operable to indicate read type instructions with static identifiers thereof, respective execution displacements with potentially aliasing instances of write type instructions, and respective alias prediction confidence;
a second structure operable to indicate write type instructions with static identifiers thereof; and
a third structure operable to indicate particular instances of write type instructions with dynamic identifiers and register information thereof.

64. The apparatus of claim 63 further comprising:
the first and second structures operable to also indicate alias prediction validity; and
the third structure operable to also indicate pending unverified alias predictions.

* * * * *